US011761528B2

(12) United States Patent
Okuhata

(10) Patent No.: US 11,761,528 B2
(45) Date of Patent: Sep. 19, 2023

(54) GEARBOX AND MOTOR DRIVER

(71) Applicant: Nidec Corporation, Kyoto (JP)

(72) Inventor: Yoshihisa Okuhata, Kanagawa (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/724,498

(22) Filed: Apr. 20, 2022

(65) Prior Publication Data

US 2022/0243799 A1 Aug. 4, 2022

Related U.S. Application Data

(63) Continuation of application No. 16/581,767, filed on Sep. 25, 2019, now Pat. No. 11,313,450.

(30) Foreign Application Priority Data

Sep. 28, 2018 (JP) ................................. 2018-184025

(51) Int. Cl.
*F16H 57/023* (2012.01)
*F16H 63/34* (2006.01)
*F16H 57/02* (2012.01)

(52) U.S. Cl.
CPC ....... *F16H 57/023* (2013.01); *F16H 63/3416* (2013.01); *F16H 2057/02043* (2013.01)

(58) Field of Classification Search
CPC ............... F16H 57/023; F16H 63/3416; F16H 2057/02043; F16H 63/3458; F16H 63/3466; F16H 63/3475
See application file for complete search history.

(56) References Cited

U.S. PATENT DOCUMENTS

| 6,692,394 B2 | 2/2004 | Takenaka |
| 9,080,670 B2 * | 7/2015 | Komatsu ............. F16H 63/3458 |
| 9,160,214 B2 | 10/2015 | Matsuda |

(Continued)

FOREIGN PATENT DOCUMENTS

| DE | 60126377 | 11/2007 |
| DE | 102016109553 | 11/2017 |

(Continued)

OTHER PUBLICATIONS

Okuhata, "Gearbox and Motor Driver", U.S. Appl. No. 16/581,767, filed Sep. 25, 2019.

*Primary Examiner* — Thomas C Diaz
(74) *Attorney, Agent, or Firm* — JCIPRNET

(57) ABSTRACT

A gearbox and a motor driver having the gearbox are provided. The gearbox includes: a first gear, configured to be rotatable around a first gear shaft parallel to a first direction; a second gear, configured to be rotatable around a second gear shaft parallel to the first gear shaft, and the second gear engages with the first gear, and an outer diameter of the second gear is larger than an outer diameter of the first gear; a parking gear portion, configured to be rotatable around the second gear shaft; a rotation prevention member, configured to be movable between a position where the rotation prevention member is interposed between teeth of the parking gear portion and a position where the rotation prevention member is not interposed between the teeth of the parking gear portion; and a transmission mechanism, configured to transmit a driving force to the rotation prevention member.

16 Claims, 3 Drawing Sheets

(56) References Cited

U.S. PATENT DOCUMENTS

| 10,151,364 B2 * | 12/2018 | Miebach | B60T 13/66 |
| 10,281,038 B2 | 5/2019 | Kunieda et al. | |
| 10,378,629 B2 * | 8/2019 | Hiyoshi | B60T 1/005 |

FOREIGN PATENT DOCUMENTS

| JP | 5638622 | 12/2014 |
| JP | 2017211086 | 11/2017 |
| JP | 2018080807 | 5/2018 |
| JP | 2018105344 | 7/2018 |

* cited by examiner

GEARBOX AND MOTOR DRIVER

CROSS REFERENCE TO RELATED APPLICATIONS

The present application is a continuation application of U.S. application Ser. No. 16/581,767 filed on Sep. 25, 2019, now allowed. The prior U.S. application Ser. No. 16/581,767 claims the priority benefits of Japanese Patent Application No. 2018-184025, filed on Sep. 28, 2018. The entirety of each of the above-mentioned patent applications is hereby incorporated by reference herein and made a part of this specification.

TECHNICAL FIELD

The disclosure relates to a gearbox and a motor driver.

DESCRIPTION OF RELATED ART

Conventionally, a gearbox is known which includes a plurality of gears, a parking gear portion configured of a single member with any one of the plurality of gears, and a rotation prevention member that prevents rotation of the plurality of gears.

For example, a transaxle disclosed in Patent Document 1 (Japanese Patent Laid-Open No. 2015-34593) includes a parking gear portion, a counter drive gear, and a counter driven gear which engages with the counter drive gear to receive a driving force from the counter drive gear. The parking gear portion and the counter drive gear rotate integrally on a coaxial line. When a locking member engages with the parking gear portion, rotation of each gear is prevented, and thus rotation of a driving wheel in a parked vehicle is locked. Although not specifically disclosed in Patent Document 1, engaging the locking member with the parking gear portion is considered to mean that the locking member is interposed between teeth of the parking gear portion.

Patent Document 1 does not disclose how the locking member engages with the parking gear portion. In a parking locking device of a transaxle disclosed in Patent Document 2 (Japanese Patent Laid-Open No. H07-132741), when a predetermined operation is performed in a driver's seat, a parking ball to which a force is applied via a cable, an arm, an operation rod and the like moves a protrusion to a position where it engages with the parking gear portion.

[Patent Document 1] Japanese Patent Laid-Open No. 2015-34593

[Patent Document 2] Japanese Patent Laid-Open No. H07-132741

In a mechanism for performing parking locking based on a manual operation of a driver like in the parking locking device disclosed in Patent Document 2, inconvenience is caused for the driver. When a configuration in which a rotation prevention member such as a parking ball is electrically moved is adopted in order to reduce inconvenience for a driver, a problem of making cost reduction and space saving difficult arises due to additional installation of a drive source such as a motor.

SUMMARY

An aspect of the disclosure is a gearbox mounted on a vehicle, the gearbox including a plurality of gears which engage with each other to transmit a driving force from a driving side to a driven side, a parking gear portion which is configured of a single member together with any one of the plurality of gears and rotates about the same axis as that of the any one of the plurality of gears, and a rotation prevention member which can move between a position where the rotation prevention member is interposed between teeth of the parking gear portion to prevent rotation of the parking gear portion thereby preventing rotation of the plurality of gears and a position where the rotation prevention member is not interposed between the teeth. The gearbox includes an electric pump which transfers refrigerant and a transmission mechanism which transmits a driving force of a motor shaft of the electric pump to the rotation prevention member.

Another aspect of the disclosure is a gearbox including: a first gear, configured to be rotatable around a first gear shaft parallel to a first direction; a second gear, configured to be rotatable around a second gear shaft parallel to the first gear shaft, wherein the second gear engages with the first gear, and an outer diameter of the second gear is larger than an outer diameter of the first gear; a parking gear portion, configured to be rotatable around the second gear shaft; a rotation prevention member (i.e., rotation prevention arm 86), configured to be movable between a position where the rotation prevention member is interposed between teeth of the parking gear portion and a position where the rotation prevention member is not interposed between the teeth of the parking gear portion; and a transmission mechanism, configured to transmit a driving force to the rotation prevention member. The transmission mechanism overlaps with the second gear in a second direction orthogonal to the first direction. The rotation prevention member overlaps with the second gear in a third direction orthogonal to the first direction and the second direction.

According to an embodiment of the gearbox of the disclosure, the parking gear portion is configured of a single member together with the second gear.

According to an embodiment of the gearbox of the disclosure, the first gear is disposed on one side of the second gear in the third direction, and the rotation prevention member is disposed on the other side of the second gear in the third direction.

According to an embodiment of the gearbox of the disclosure, the second gear includes a large diameter gear portion, and a small diameter gear portion having an outer diameter smaller than an outer diameter of the large diameter gear portion. The gearbox further includes a differential gear, configured to engage with the large diameter gear portion or the small diameter gear portion, and at least a part of the rotation prevention member overlaps with the differential gear in the first direction.

According to an embodiment of the gearbox of the disclosure, the gearbox further includes a pump. The transmission mechanism is configured to transmit the driving force of the pump to the rotation prevention member.

According to an embodiment of the gearbox of the disclosure, the transmission mechanism, the second gear and the pump are overlapped in the second direction.

According to an embodiment of the gearbox of the disclosure, the first gear is disposed on one side of the pump and the transmission mechanism in the third direction.

According to an embodiment of the gearbox of the disclosure, the second gear includes a large diameter gear portion, and a small diameter gear portion having an outer diameter smaller than an outer diameter of the large diameter gear portion. The gearbox further includes a differential gear, configured to engage with the large diameter gear portion or the small diameter gear portion. The transmission mechanism, the second gear, the pump and the differential gear are overlapped in the second direction.

According to an embodiment of the gearbox of the disclosure, the gearbox further includes a case, configured to accommodate the transmission mechanism. The case includes a through hole. One of a plurality of rotational shafts of the transmission mechanism passes through the through hole from an inside of the case and protrudes out of the case, and a clearance is provided between the one rotational shaft and an inner wall of the through hole.

According to an embodiment of the gearbox of the disclosure, the gearbox further includes a pump. The transmission mechanism includes a solenoid. The pump and the solenoid are fixed to one side of the case in the second direction. One of the plurality of rotational shafts protrudes from the other side of the case in the second direction.

Another aspect of the disclosure is a motor driver including: the above gearbox; a motor; and an inverter. The rotation prevention member is disposed on the other side of the second gear in the third direction. The inverter is disposed on one side of the second gear in the third direction.

According to an embodiment of the motor driver of the disclosure, the second gear includes a large diameter gear portion, and a small diameter gear portion having an outer diameter smaller than an outer diameter of the large diameter gear portion. The gearbox further includes: a differential gear, configured to engage with the large diameter gear portion or the small diameter gear portion, and a pump. The inverter overlaps with the differential gear in the third direction. The inverter is disposed on one side of the pump and the transmission mechanism in the third direction.

According to an embodiment of the motor driver of the disclosure, when viewed from the first direction, a virtual line connecting a center of the first gear and a center of the second gear is defined as a first virtual line, a virtual line connecting the center of the second gear and a center of the differential gear is defined as a second virtual line. Among two regions partitioned by the first virtual line and the second virtual line, the rotation prevention member and the inverter are arranged in different regions.

Another aspect of the disclosure is a motor driver including: the above gearbox; a pump; a motor; and an inverter. The pump is configured to circulate a refrigerant between the inverter and a vehicle radiator.

According to an embodiment of the gearbox of the disclosure, the gearbox further includes an oil cooler. The pump is configured to circulate a refrigerant between the gearbox and the oil cooler.

DESCRIPTION OF EMBODIMENTS

Figure 1:
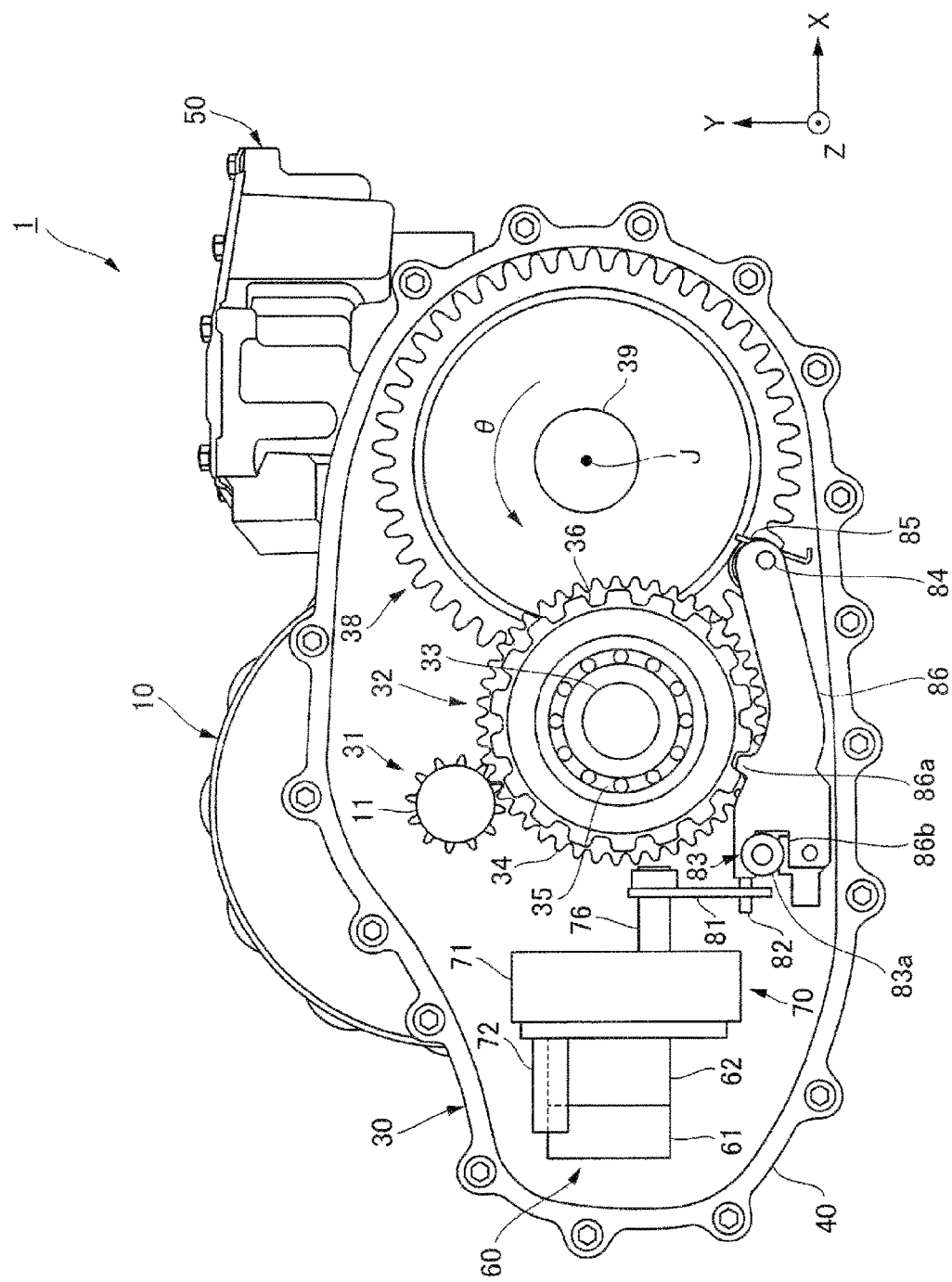
FIG. 1 is a rear view of a motor driver according to an embodiment.

According to an aspect of the disclosure, it is possible to reduce inconvenience for a driver at the time of parking locking, thereby curbing cost reduction and space saving becoming difficult due to additional installation of a drive source for parking locking.

Hereinafter, an embodiment of a motor driver according to the disclosure will be described with reference to the drawings. The motor driver is used as a drive source and drive mechanism of an electric vehicle.

In the following drawings, in order to make each configuration easy to understand, the actual structure may be different in scale and numbers from each structure.

Also, in the drawings, an XYZ coordinate system is appropriately shown as a three-dimensional orthogonal coordinate system. In the XYZ coordinate system, the Z-axis direction is a direction parallel to an axial direction of a central axis J shown in FIG. 1. The X-axis direction is a direction parallel to a lateral direction of a motor 10 of the motor driver 1 shown in FIG. 1. The Y-axis direction is a direction orthogonal to both the X-axis direction and the Z-axis direction.

Further, in the following description, a positive side (a motor 10 side) in the Z-axis direction shown in FIG. 1 is referred to as "rear side," and a negative side (a transaxle 30 side) in the Z-axis direction is referred to as "front side." Also, the rear side and the front side are just names used for explanation and do not limit actual positional relationships and directions. In addition, unless otherwise specified, a direction parallel to the central axis J (Z-axis direction) is simply referred to as an "axial direction," a radial direction centering on the central axis J is simply referred to as a "radial direction," and a circumferential direction centered on the central axis J, that is, a direction turning around the central axis J (an θ direction in FIG. 1) is simply referred to as a "circumferential direction."

Also, in the present specification, the term "extend in the axial direction" includes not only a case of strictly extending in the axial direction (Z-axis direction) but also a case of extending in a direction inclined with respect to the axial direction within a range of less than 45 degrees. Further, in the present specification, the term "extend in the radial direction" includes not only a case of strictly extending in the radial direction, that is, a direction perpendicular to the axial direction (Z-axis direction), but also a case of extending in a direction inclined with respect to the radial direction within a range of less than 45 degrees.

<Overall Configuration>

FIG. 1 is a rear view of a motor driver 1 according to an embodiment. FIG. 1 shows a transaxle 30 with a rear cover thereof removed. As shown in FIG. 1, the motor driver 1 includes a motor 10, an inverter 50 which controls driving of the motor, and a transaxle 30 which is a gearbox that transmits a driving force of the motor 10 to a wheel drive shaft of a vehicle. In addition, the motor driver 1 includes an electric pump 60, a transmission mechanism 70, and a rotation prevention arm 86.

Further, as shown in FIG. 1, the motor driver 1 is designed on the assumption that a second gear 32 is attached to the vehicle in a posture in which the second gear 32 is positioned below a first gear 31 in a direction of gravity.

<Transaxle 30>

In FIG. 1, the transaxle 30 includes the first gear 31, the second gear 32, and a differential gear 38. The first gear 31 is disposed closer to a driving side than the second gear 32 and the differential gear 38 are, and receives a driving force of a motor shaft 11 of the motor 10 and rotates around an axis of the motor shaft 11.

The second gear 32 includes a large diameter gear portion 34, a small diameter gear portion (not shown), a parking gear portion 36, and a ball bearing 35. The small diameter gear portion is disposed closer to the motor 10 side in the Z-axis direction than the large diameter gear portion 34 is. The large diameter gear portion 34, the small diameter gear portion, and the parking gear portion 36 all rotate about a second gear shaft 33. The second gear shaft 33 is a fixed shaft that does not rotate. The second gear 32 receives the driving force from the first gear 31 via the large diameter gear portion 34 that engages with the first gear 31 and rotates on the ball bearing 35. The second gear 32 transmits the driving force to the differential gear 38 via the small diameter gear portion.

The differential gear 38 constitutes an operating mechanism. In FIG. 1, for the sake of convenience, only a largest diameter ring gear portion of the differential gear 38 is shown. The differential gear 38 includes a pinion gear portion, a side gear portion and the like in addition to the ring gear portion. The ring gear portion rotates around a differential gear shaft 39. The wheel drive shaft (drive shaft) of the vehicle rotates about the same axis as that of the differential gear shaft 39.

The rotation prevention arm 86 which can swing about a swing shaft 84 is disposed below the second gear 32. The swing shaft 84 is provided at one end portion of the rotation prevention arm 86 in the X-axis direction. The rotation prevention arm 86 is biased by a spring 85 in a counterclockwise direction in FIG. 1 around the swing shaft 84. A recessed portion 86b which opens toward the other side in the X-axis direction is provided at the other end portion of the rotation prevention arm 86 in the X-axis direction. A rod 83 that is movable in the Z-axis direction is disposed in the recessed portion 86b. The rod 83 has a truncated conical push-up portion 83a extending in the Z-axis direction. A diameter of the push-up portion 83a gradually decreases from the transaxle 30 side toward the motor 10 side in the Z-axis direction. FIG. 1 shows a state in which a largest diameter portion of the push-up portion 83a is positioned in the recessed portion 86b of the rod 83 and the rod 83 is pushed up in a clockwise direction in FIG. 1 against a biasing force of the spring 85. By this push-up operation, a protruding portion 86a of the rotation prevention arm 86 is interposed between teeth of the parking gear portion 36 of the second gear 32 thereby preventing rotation of the second gear 32 as well. By preventing rotation of the second gear 32, rotation of the first gear 31 and the differential gear 38 is also prevented.

<Inverter 50>

The inverter 50 controls driving of the motor 10. The inverter 50 accommodates an electronic circuit board on which an insulated gate bipolar transistor (IGBT) or the like is mounted in a casing body.

<Electric Pump 60>

Oil for cooling each gear is accommodated in a housing 40 of the transaxle 30. Oil as a refrigerant that remains in a lower portion that is an end portion in the housing 40 on a negative side in the Y-axis direction is pumped up by the rotating second gear 32 and the differential gear 38 and adheres to each gear. The electric pump 60 sends the oil pumped up from the lower portion of the housing 40 toward an oil cooler disposed outside the housing 40. The oil cooled by the oil cooler is returned into the housing 40.

<Transmission Mechanism 70>

The rod 83 described above is a part of the transmission mechanism 70 that transmits the driving force of the motor shaft 63 of the electric pump 60 to the rotation prevention arm 86. The transmission mechanism 70 includes an actuator 71, a solenoid 72, an output shaft 76, an arm 81, a connecting pin 82, and the rod 83. The actuator 71 includes a plurality of gears in a case.

Figure 2:
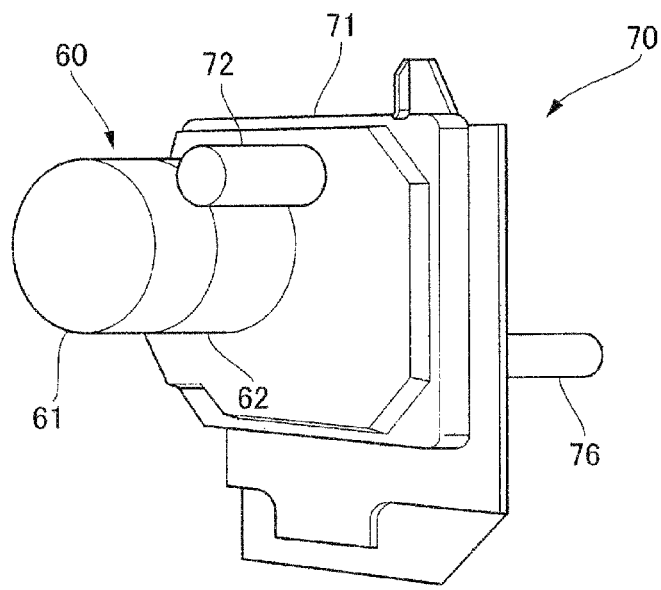
FIG. 2 is a perspective view showing an actuator of a transmission mechanism of the motor driver together with an electric pump.

FIG. 2 is a perspective view showing the actuator 71 of the transmission mechanism 70 together with the electric pump 60. The electric pump 60 including a motor unit 62 and a pump unit 61 is fixed to the case of the actuator 71. In addition, the solenoid 72 of the transmission mechanism 70 is also fixed to the case of the actuator 71.

Figure 3:
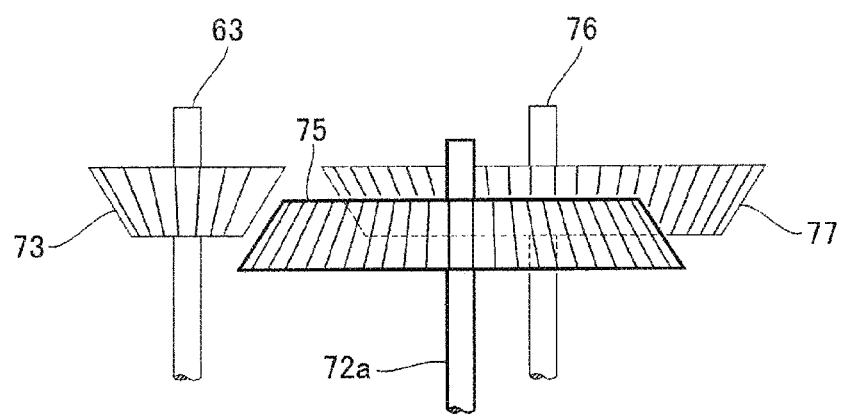
FIG. 3 is a plan view showing each gear accommodated in a case of the actuator.

FIG. 3 is a plan view showing each gear accommodated in the case of the actuator 71. The actuator 71 includes a driving gear 73, an idler gear 75, and an output gear 77. The driving gear 73 is fixed to the motor shaft 63 of the electric pump 60 and rotates together with the motor shaft 63. That is, when the electric pump 60 that transfers oil is driven, the driving gear 73 rotates.

Figure 4:
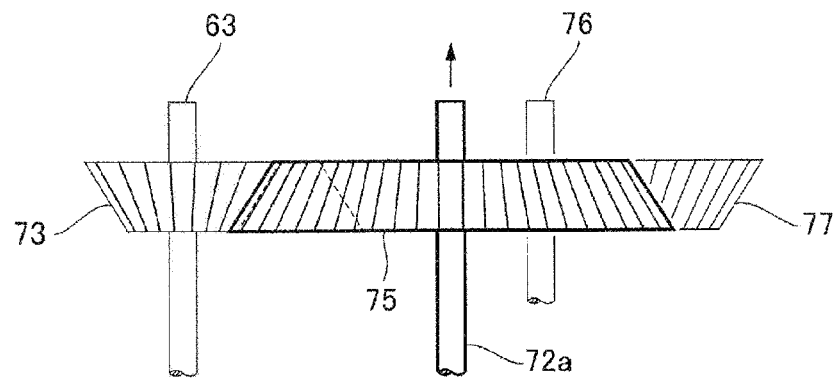
FIG. 4 is a plan view showing each gear in a state where a driving force of a motor shaft is connected to an output gear by a clutch.

The idler gear 75 is a gear that transmits a driving force received from the driving gear 73 to the output gear 77, but in FIG. 3, the idler gear 75 does not engage with both the driving gear 73 and the output gear 77. FIG. 3 shows the driving gear 73, the idler gear 75, and the output gear 77 when viewed from above (from a positive side in the Y-axis direction). The output gear 77 is disposed below the idler gear 75. In a state where the solenoid 72 is not driven, the idler gear 75 fixed to a shaft 72a of the solenoid 72 is retracted from positions where it engages with the driving gear 73 and the output gear 77, as shown in FIG. 3. When the solenoid 72 is driven, the idler gear 75 moves with the shaft 72a of the solenoid 72 and engages with the driving gear 73 and the output gear 77, as shown in FIG. 4. By these engagements, a rotational force of the motor shaft 63 is transmitted to the output shaft 76 via the driving gear 73, the idler gear 75, and the output gear 77.

Also, in the motor driver 1 according to the embodiment, a combination of the solenoid 72 and the idler gear 75 functions as a clutch that connects the driving force between the motor shaft 63 of the electric pump 60 and the transmission mechanism 70.

Figure 5:
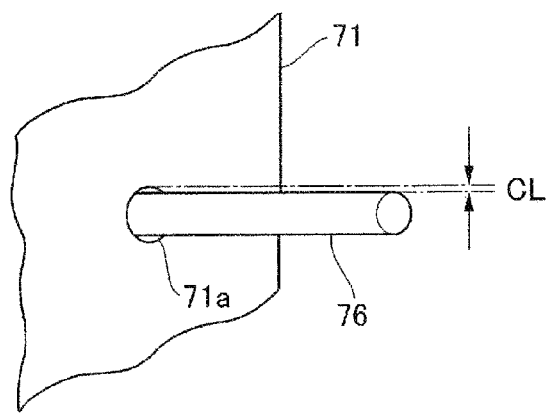
FIG. 5 is a partial perspective view showing the case of the actuator and an output shaft.

As shown in FIG. 5, the output shaft 76 passes through a through hole 71a of the case of the actuator 71 and protrudes out of the case. A predetermined clearance CL is provided between an inner wall of the through hole 71a and the output shaft 76.

In FIG. 1, when the output shaft 76 of the transmission mechanism 70 rotates forward by a predetermined rotation angle, the arm 81 moves the connecting pin 82 by a predetermined amount along the Z-axis direction from the transaxle 30 side toward the motor 10 side. Along with this movement, the rod 83 moved along the Z-axis direction causes the largest diameter portion of the push-up portion 83a to enter the recessed portion 86b of the rotation prevention arm 86, thereby pushing up the rotation prevention arm 86. With this pushing up, the rotation prevention arm 86 interposes the protruding portion 86a between the teeth of the parking gear portion 36 to prevent rotation of the second gear 32.

On the other hand, when the output shaft 76 of the transmission mechanism 70 rotates backward by a predetermined rotation angle, the arm 81 moves the connecting pin 82 by a predetermined amount along the Z-axis direction from the motor 10 side toward the transaxle 30 side. Along with this movement, the rod 83 moved along the Z-axis direction causes a smallest diameter portion of the push-up portion 83a to enter the recessed portion 86b of the rotation prevention arm 86, thereby lowering the rotation prevention arm 86. Then, the protruding portion 86a of the rotation prevention arm 86 comes out from between the teeth of the parking gear portion 36 to allow rotation of the second gear 32.

<Operational Effects of Motor Driver 1>

(1) In the motor driver 1 according to the embodiment, the driving force of the motor shaft 63 of the electric pump 60 that circulates the oil in the transaxle 30 between the oil cooler and the housing 40 is transmitted to the rotation prevention arm 86 via the transmission mechanism 70. According to the motor driver 1 according to the embodiment, by transmitting the driving force of the motor shaft 63 of the electric pump 60 provided in the vehicle to the rotation prevention arm 86, a parking brake operation can be electrically powered to reduce inconvenience for a driver when the driver performs a parking locking operation.

According to the motor driver 1 according to the embodiment, since the electric pump 60 provided in the vehicle is also used as a drive source for the rotation prevention arm 86, it is possible to curb cost reduction and space saving becoming difficult due to additional installation of a drive source for parking locking.

Further, instead of using the electric pump 60 (oil pump) also as the drive source for the rotation prevention arm 86, another electric pump may be used as the drive source for the rotation prevention arm 86. For example, an electric pump (oil pump) for circulating oil between the motor 10 and the oil cooler may be used as the drive source for the rotation prevention arm 86. According to such a configuration, by using an electric pump that circulates oil between the motor 10 and the oil cooler as the drive source of the rotation prevention arm 86, it is possible to curb cost reduction and space saving becoming difficult due to additional installation of a drive source for parking locking.

Also, an electric pump for circulating a refrigerant such as water between the inverter 50 and a vehicle radiator may also be used as the drive source for the rotation prevention arm 86. According to such a configuration, by using the electric pump that circulates the refrigerant between the inverter 50 and the radiator as the drive source of the rotation prevention arm 86, it is possible to curb cost reduction and space saving becoming difficult due to additional installation of a drive source for parking locking.

(2) In the motor driver 1 according to the embodiment, at the time of driving in which the electric pump 60 is required to be driven to transfer the oil and the rotation prevention arm 86 is required not to be driven, both of the two requirements can be met. Specifically, the motor driver 1 cuts off the drive transmission from the motor shaft 63 of the electric pump 60 to the transmission mechanism 70 by using the clutch configured of the solenoid 72 or the like, whereby it is possible to stop driving of the rotation prevention arm 86 while driving the electric pump 60. Also, at the time of releasing the parking brake and operating the parking brake, the electric pump 60 is driven while the drive transmission from the motor shaft 63 to the transmission mechanism 70 is connected by the clutch. With this drive transmission, it is possible to move the rotation prevention arm 86 to a rotation prevention position (a position where the protruding portion 86*a* is interposed between the teeth of the parking gear portion 36) or a release position (a position where the protruding portion 86*a* is removed from between the teeth of the parking gear portion 36). Therefore, according to the motor driver 1 according to the embodiment, by operating the clutch as needed, the rotation prevention arm 86 can be moved to an appropriate position at an appropriate timing regardless of whether or not there is a drive request for the electric pump 60 for oil cooling.

(3) According to the motor driver 1 according to the embodiment, the clutch operation can be electric-powered by driving the clutch using the solenoid 72.

(4) In the motor driver 1 according to the embodiment, by disposing the electric pump 60 and the transmission mechanism 70 in the housing 40 of the transaxle 30, the transaxle 30 can be downsized even in the case of the transaxle 30 having the electric pump 60.

(5) In the motor driver 1 according to the embodiment, the clearance CL is provided between the inner wall of the through hole 71*a* of the case of the actuator 71 and the output shaft 76 that passes through the through hole 71*a*. The oil in the housing 40 enters the case through the clearance CL between the inner wall of the through hole 71*a* of the case of the actuator 71 and the output shaft 76. According to the motor driver 1 according to the embodiment, by causing the oil in the housing 40 of the transaxle 30 to enter the case of the transmission mechanism 70, the oil of the transaxle 30 can be used to improve lubricity of each gear of the actuator 71.

While the exemplary embodiments of the disclosure have been described and illustrated above, it should be understood that these are exemplary of the disclosure and are not to be considered as limiting. Additions, omissions, substitutions, and other modifications can be made without departing from the spirit or scope of the disclosure. Accordingly, the disclosure is not to be considered as being limited by the foregoing description, and is only limited by the scope of the appended claims.

What is claimed is:

1. A gearbox, comprising:
    a first gear, configured to be rotatable around a first gear shaft parallel to a first direction;
    a second gear, configured to be rotatable around a second gear shaft parallel to the first gear shaft, wherein the second gear engages with the first gear, and an outer diameter of the second gear is larger than an outer diameter of the first gear;
    a parking gear portion, configured to be rotatable around the second gear shaft;
    a rotation prevention member, configured to be movable between a position where the rotation prevention member is interposed between teeth of the parking gear portion and a position where the rotation prevention member is not interposed between the teeth of the parking gear portion; and
    a transmission mechanism, configured to transmit a driving force to the rotation prevention member,
    wherein
    the transmission mechanism overlaps with the second gear in a second direction orthogonal to the first direction,
    the rotation prevention member overlaps with the second gear in a third direction orthogonal to the first direction and the second direction,
    the second gear comprises a large diameter gear portion, and a small diameter gear portion having an outer diameter smaller than an outer diameter of the large diameter gear portion;
    wherein the gearbox further comprises a differential gear, configured to engage with the large diameter gear portion or the small diameter gear portion, and
    at least a part of the rotation prevention member overlaps with the differential gear in the first direction.

2. The gearbox according to claim 1, wherein
    the parking gear portion is configured of a single member together with the second gear.

3. The gearbox according to claim 1, wherein
the first gear is disposed on one side of the second gear in the third direction,
the rotation prevention member is disposed on the other side of the second gear in the third direction.
4. The gearbox according to claim 1, further comprising:
a pump,
wherein the transmission mechanism is configured to transmit the driving force of the pump to the rotation prevention member.
5. The gearbox according to claim 4, wherein
the transmission mechanism, the second gear and the pump are overlapped in the second direction.
6. The gearbox according to claim 4, wherein
the first gear is disposed on one side of the pump and the transmission mechanism in the third direction.
7. The gearbox according to claim 4, wherein
the second gear comprises a large diameter gear portion, and a small diameter gear portion having an outer diameter smaller than an outer diameter of the large diameter gear portion;
wherein the gearbox further comprises a differential gear, configured to engage with the large diameter gear portion or the small diameter gear portion, and
the transmission mechanism, the second gear, the pump and the differential gear are overlapped in the second direction.
8. The gearbox according to claim 1, further comprising:
a case, configured to accommodate the transmission mechanism,
wherein the case includes a through hole,
one of a plurality of rotational shafts of the transmission mechanism passes through the through hole from an inside of the case and protrudes out of the case, and
a clearance is provided between the one rotational shaft and an inner wall of the through hole.
9. The gearbox according to claim 8, further comprising:
a pump,
wherein the transmission mechanism includes a solenoid,
the pump and the solenoid are fixed to one side of the case in the second direction,
one of the plurality of rotational shafts protrudes from the other side of the case in the second direction.
10. The gearbox according to claim 4, further comprising:
an oil cooler,
wherein the pump is configured to circulate a refrigerant between the gearbox and the oil cooler.
11. A motor driver comprising:
the gearbox according to claim 1;
a motor; and
an inverter,
wherein the rotation prevention member is disposed on the other side of the second gear in the third direction, and
the inverter is disposed on one side of the second gear in the third direction.
12. The motor driver according to claim 11, wherein
the second gear comprises a large diameter gear portion, and a small diameter gear portion having an outer diameter smaller than an outer diameter of the large diameter gear portion;
wherein the gearbox further comprises:
a differential gear, configured to engage with the large diameter gear portion or the small diameter gear portion, and
a pump;
wherein the inverter overlaps with the differential gear in the third direction, and
the inverter is disposed on one side of the pump and the transmission mechanism in the third direction.
13. The motor driver according to claim 11, wherein
the second gear comprises a large diameter gear portion, and a small diameter gear portion having an outer diameter smaller than an outer diameter of the large diameter gear portion;
wherein the gearbox further comprises:
a differential gear, configured to engage with the large diameter gear portion or the small diameter gear portion;
when viewed from the first direction,
a virtual line connecting a center of the first gear and a center of the second gear is defined as a first virtual line,
a virtual line connecting the center of the second gear and a center of the differential gear is defined as a second virtual line,
among two regions partitioned by the first virtual line and the second virtual line, the rotation prevention member and the inverter are arranged in different regions.
14. A motor driver comprising:
the gearbox according to claim 1;
a pump;
a motor; and
an inverter,
wherein the pump is configured to circulate a refrigerant between the inverter and a vehicle radiator.
15. A gearbox, comprising:
a first gear, configured to be rotatable around a first gear shaft parallel to a first direction;
a second gear, configured to be rotatable around a second gear shaft parallel to the first gear shaft, wherein the second gear engages with the first gear, and an outer diameter of the second gear is larger than an outer diameter of the first gear;
a parking gear portion, configured to be rotatable around the second gear shaft;
a rotation prevention member, configured to be movable between a position where the rotation prevention member is interposed between teeth of the parking gear portion and a position where the rotation prevention member is not interposed between the teeth of the parking gear portion;
a transmission mechanism, configured to transmit a driving force to the rotation prevention member; and
a pump,
wherein
the transmission mechanism overlaps with the second gear in a second direction orthogonal to the first direction,
the rotation prevention member overlaps with the second gear in a third direction orthogonal to the first direction and the second direction, and
the transmission mechanism is configured to transmit the driving force of the pump to the rotation prevention member,
the second gear comprises a large diameter gear portion, and a small diameter gear portion having an outer diameter smaller than an outer diameter of the large diameter gear portion;
wherein the gearbox further comprises a differential gear, configured to engage with the large diameter gear portion or the small diameter gear portion, and the transmission mechanism, the second gear, the pump and the differential gear are overlapped in the second direction.

16. A motor driver, comprising:

a motor;

an inverter, a first gear, configured to be rotatable around a first gear shaft parallel to a first direction;

a second gear, configured to be rotatable around a second gear shaft parallel to the first gear shaft, wherein the second gear engages with the first gear, and an outer diameter of the second gear is larger than an outer diameter of the first gear;

a parking gear portion, configured to be rotatable around the second gear shaft;

a rotation prevention member, configured to be movable between a position where the rotation prevention member is interposed between teeth of the parking gear portion and a position where the rotation prevention member is not interposed between the teeth of the parking gear portion; and a transmission mechanism, configured to transmit a driving force to the rotation prevention member, wherein the transmission mechanism overlaps with the second gear in a second direction orthogonal to the first direction, the rotation prevention member overlaps with the second gear in a third direction orthogonal to the first direction and the second direction, wherein the rotation prevention member is disposed on the other side of the second gear in the third direction, and the inverter is disposed on one side of the second gear in the third direction, and the second gear comprises a large diameter gear portion, and a small diameter gear portion having an outer diameter smaller than an outer diameter of the large diameter gear portion;

wherein a differential gear is further provided and configured to engage with the large diameter gear portion or the small diameter gear portion when viewed from the first direction, a virtual line connecting a center of the first gear and a center of the second gear is defined as a first virtual line, a virtual line connecting the center of the second gear and a center of the differential gear is defined as a second virtual line, among two regions partitioned by the first virtual line and the second virtual line, the rotation prevention member and the inverter are arranged in different regions.

* * * * *